Dec. 26, 1933.  L. H. THOEN  1,941,026
COMBINED HARVESTER-THRESHER
Filed April 27, 1931  2 Sheets-Sheet 1
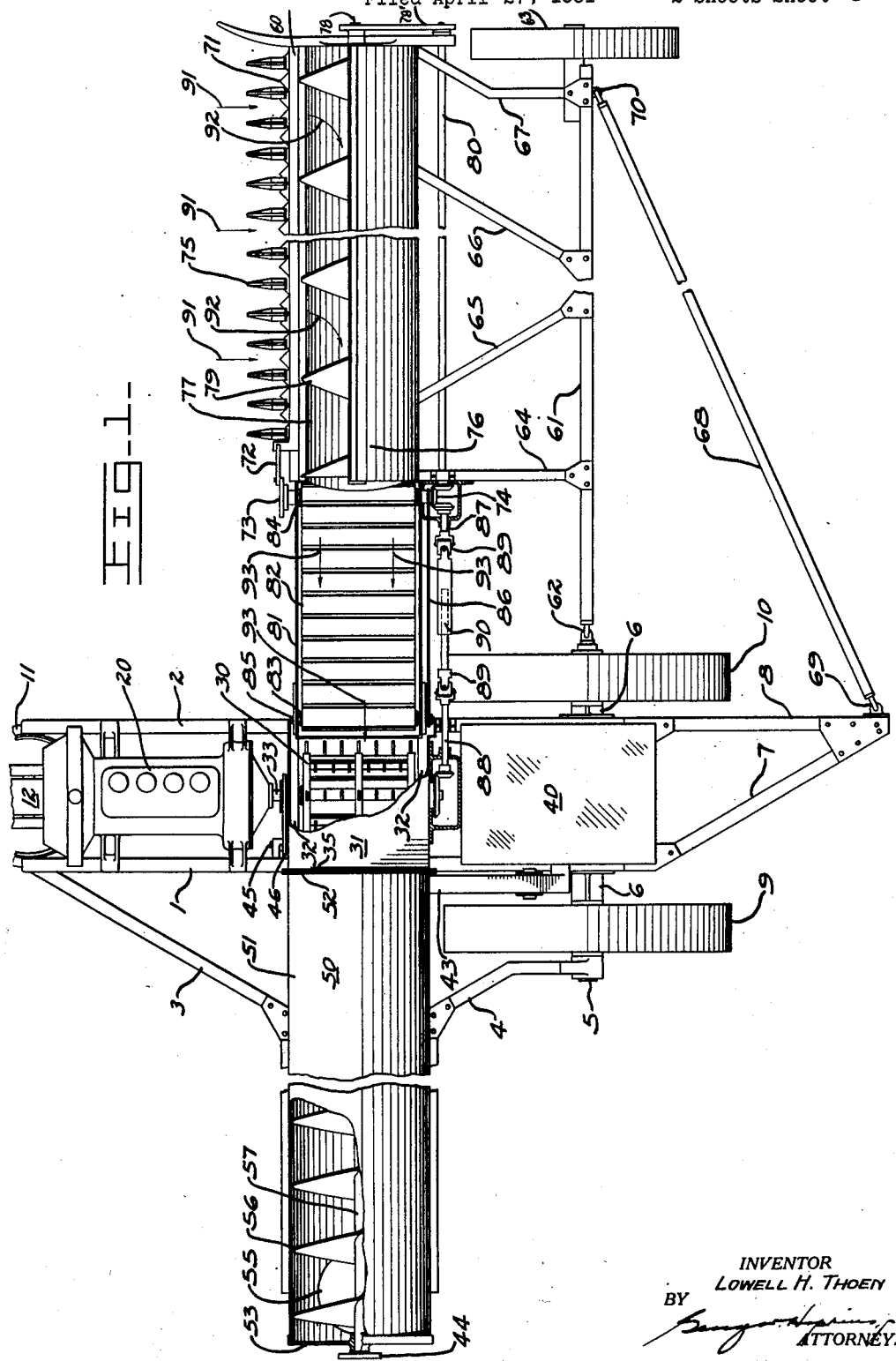
Fig-1-
INVENTOR
LOWELL H. THOEN
BY
ATTORNEYS Dec. 26, 1933.  L. H. THOEN  1,941,026
COMBINED HARVESTER-THRESHER
Filed April 27, 1931   2 Sheets-Sheet 2
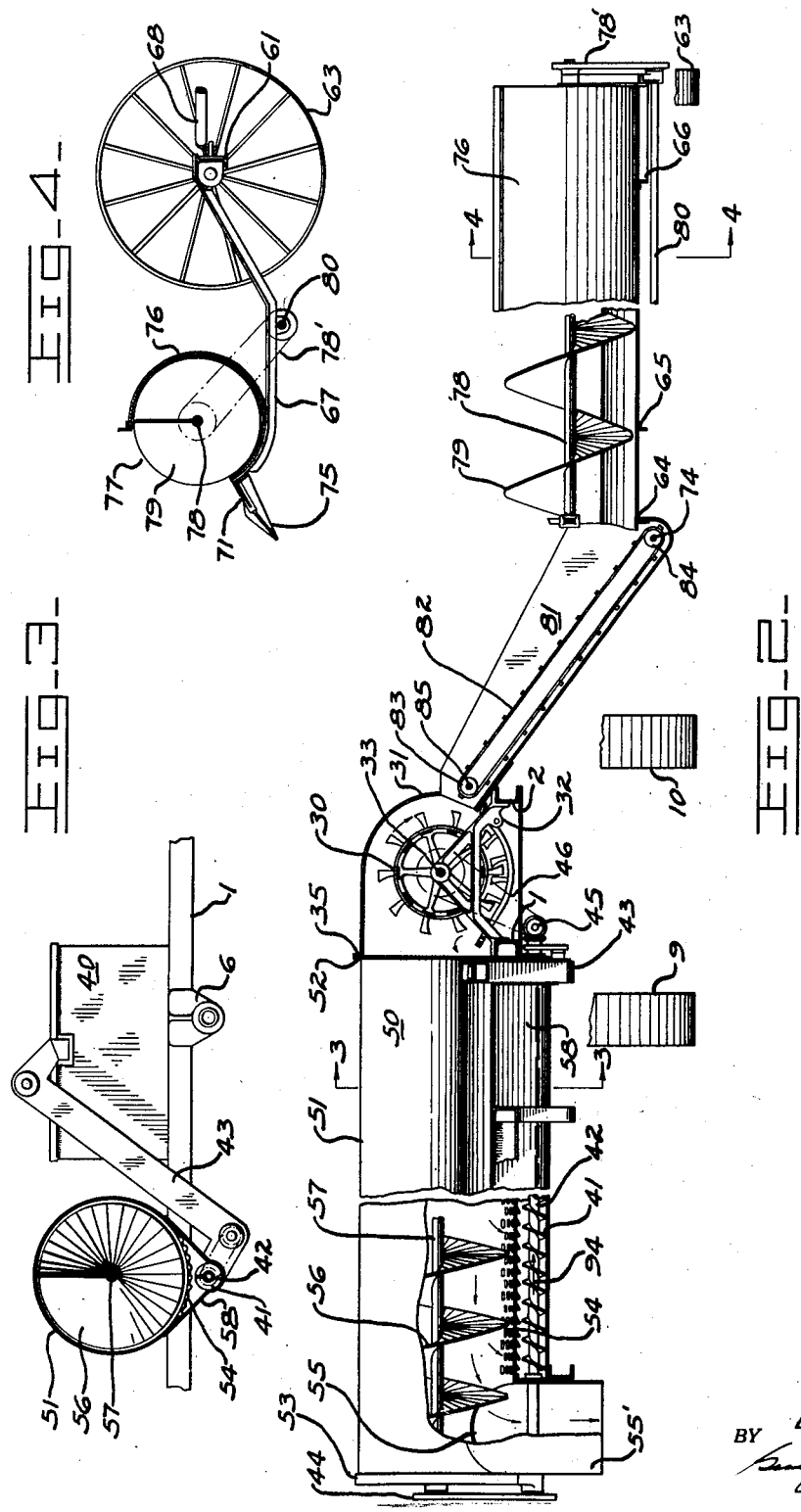
INVENTOR
LOWELL H. THOEN
BY
ATTORNEYS Patented Dec. 26, 1933

1,941,026

UNITED STATES PATENT OFFICE 1,941,026

COMBINED HARVESTER-THRESHER

Lowell H. Thoen, San Leandro, Calif., assignor to Caterpillar Tractor Co., San Leandro, Calif., a corporation of California Application April 27, 1931. Serial No. 533,211

17 Claims. (Cl. 56—20)

This invention relates to combined harvester-threshers, and particularly to the arrangement of the parts thereof.

The object of the invention is to provide a machine in which the material is moved in a substantially straight line from the time the grain is cut until the threshing and separating operations are finally completed.

Fig. 1 is a plan view of the machine with parts broken away.

Fig. 2 is a rear elevation of the machine with parts broken away.

Fig. 3 is a detailed view of the separator and the elevator to the bin, taken on line 3—3 of Fig. 2.

Fig. 4 is a section of the header taken on line 4—4 of Fig. 2.

The threshing machine is supported on a framework comprising side frames 1, 2 suitably interconnected with cross members and extension frames 3, 4, the inner ends of which are connected to side frame 1 and rear axle 5, respectively. Rear axle 5 is supported in brackets 6 secured to side frames 1, 2. Side frames 1, 2 have rearwardly extending converging extensions 7, 8. Axle 5 is provided with wheels 9, 10, and the forward end of the main frame is supported on a circle 11 in which the front wheel support 12 can turn.

Motor 20 is mounted on the forward end of the main frame and supplies power for driving the various working parts in the machine. The cylinder and concave unit 30 is mounted on the central portion of the main frame with the axis of the cylinder parallel to the longitudinal axis of the main frame. The grain bin 40 is mounted on the rear part of the main frame over the rear axle. Separator 50 is supported on the extension framework 3, 4 in line with the cylinder and concave unit.

Header 60 is mounted on a framework consisting of axis 61 hooked at 62 to axle 5 and provided with wheel 63. Frame members 64, 65, 66, 67 are secured to axle 61 and extend forwardly to support the header mechanism. Push pole 68 has one end hooked to the rear main frame extension at 69 and the other end hooked to header axle 61 at 70. The header unit can be readily disconnected by unhooking at 62 and 69. The header is provided with sickle bar 71 which is reciprocated by pitman 72 driven from crank 73 on shaft 74. Sickle bar 71 is supported for reciprocation in and for protection by guards 75 secured to the leading edge of the header frame. Cylindrical housing 76 (Fig. 4) having approximately 120° opening 77, is supported on the header framework. Shaft 78 is journaled in housing 76 and has auger 79 attached thereto. Shaft 78 is driven by chain 78' from shaft 80. Spout 81 extends inwardly and upwardly from the discharge end of auger 79 and the inner end of spout 81 rests on side frame 2 (Fig. 2) and projects into housing 31 of the cylinder and concave unit. Draper 82 is mounted on rollers 83, 84 in spout 81. Roller 84 is loose on shaft 74; roller 83 is secured to shaft 85 which is driven by chain 86 (Fig. 1) from shaft 74.

The cylinder and concave unit is supported in sub-frame 32 (Fig. 2) which is secured to side frames 1, 2. Cylinder shaft 33 is journaled in sub-frame 32 and is directly connected to the drive shaft of motor 20.

Separator housing 51 has inner flanged end 52 which is secured to flange 35 on housing 31, and as pointed out before, housing 51 is supported on extension framework 3, 4. Housing 51 is cylindrical, and is provided with end plate 53. The bottom of housing 51 is perforated at 54, and outlet 55 is provided in the bottom at the outer end. Shroud 55' is secured to housing 51 to communicate with aperture 55. Auger 56 secured to shaft 57 is mounted for rotation in the housing. Pan 58 (Fig. 3) is secured to the bottom of the housing and encloses auger 41 mounted on shaft 42 for rotation therein.

Auger 41 feeds grain kernels to grain elevator 43 which carries them to bin 40.

Shaft 42 drives shaft 57 by chain 44. Shaft 42 is driven from shaft 45 which is driven by chain 46 from shaft 33. Shafts 74 and 80 (Fig. 1) are driven from shaft 87 which is driven from shaft 88 which is driven by shaft 33. Shafts 87, 88 are operatively connected by universal joints 89 and telescopic connection 90 which can be readily broken to disconnect the header unit from the main frame.

In operation the machine is adapted to be drawn over the field, the grain encountering the header in the direction of the arrow 91, where it is cut by the sickle bar 71 and falls into the auger 79 which carries the cut grain in the direction of the arrow 92 and deposits it on the draper 82 where it is carried in the direction of the arrow 93 into the cylinder and concave unit where it is threshed. The threshed grain is discharged into the separator 50 where the straw is carried off by the auger 56 and discharged from the shroud 55'. The grain kernels drop through the perforations 54 into auger 41 which carries them in the direction of arrow 94 to elevator 43 by means of which they are transported to bulk grain bin 40.

I, therefore, claim as my invention:

1. In a combined harvester-thresher, a main frame, a rotary threshing unit mounted on said main frame with the axis of rotation of said unit parallel to the longitudinal axis of said main frame, a lateral extension on said main frame, a rotary separator mounted on said extension with the axis of rotation of said separator normal to the axis of rotation for said threshing unit.

2. In a combined harvester-thresher, a main frame, a rotary threshing unit mounted on said main frame with the axis of rotation of said unit parallel to the longitudinal axis of said main frame, a lateral extension on said main frame, a rotary separator mounted on said extension with the axis of rotation of said separator normal to the axis of rotation for said threshing unit, a header frame attached to said main frame, and a header unit mounted thereon including a rotary conveyor, the axis of rotation of said conveyor being normal to the axis of rotation of said threshing unit.

3. In a combined harvester-thresher, a main frame, a cylinder and concave unit mounted on said main frame, the axis of said cylinder being parallel to the longitudinal axis of said frame, a header frame attached to said main frame, a rotary conveyor mounted on said header frame, the axis of rotation of said conveyor being normal to the axis of rotation of said cylinder.

4. In a combined harvester-thresher, a main frame, a wheeled axle therefor, an auxiliary frame attached to said main frame, a wheeled axle for said auxiliary frame connected to said first axle, a conveyor mounted on said auxiliary frame and adapted to move material in a direction substantially parallel to said auxiliary frame axle, threshing and separating mechanism on said main frame adapted to receive material from said conveyor and to handle said material by moving all the material in a direction substantially parallel to said main frame axle.

5. In a combined harvesting-threshing machine, a main frame, a rotary threshing mechanism mounted on said main frame with the axis of rotation parallel to the longitudinal axis of said frame, a header unit at one side of said main frame, comprising means for cutting standing grain and conveyor means for collecting grain cut by said cutting means and discharging the cut grain directly into said threshing mechanism, said header unit being in alignment with said threshing mechanism, and separating mechanism adjoining said threshing mechanism, the material receiving end of said separating mechanism being positioned directly adjacent said threshing mechanism to receive all the material discharged from said threshing mechanism directly therefrom and said separating mechanism being arranged to move all of said material in a direction normal to the axis of rotation of said threshing mechanism.

6. In a combined harvesting-threshing machine, a threshing cylinder, the axis of said cylinder being parallel to the direction of movement of said machine, a header on one side of said cylinder, and a separator on the other side, said header having a cutter and a conveyor for transporting grain cut by said header transversely of the direction of movement of the machine and feeding said grain into said cylinder, the material receiving end of said separator being positioned directly adjacent said threshing cylinder to receive all of the material discharged from said cylinder directly therefrom, and said separator being arranged to move all the material along the same path.

7. In a combined harvesting-threshing machine, means including a cylinder for threshing grain, the axis of said cylinder being parallel to the direction of movement of the machine, a header having a cutter and conveying means, the discharge end of said conveying means being adjacent said cylinder, a separator, including a conveyor for moving all the material comprising mixture of straw and kernels received from the cylinder to facilitate escape of the kernels from the mixture, one end of said conveyor being located adjacent said cylinder so that the mixture of straw and kernels discharged from said cylinder falls upon said conveyor, said header, cylinder, and separator being in alignment transversely of the direction of movement of the machine, whereby all the material is moved transversely of said direction of movement of the machine.

8. In a combined harvesting-threshing machine, means including a cylinder for threshing grain, the axis of said cylinder being parallel to the direction of movement of the machine, a header comprising a cutter and a conveyor to move material transversely of the direction of movement of the machine from said cutter to said cylinder, a separator, including a conveyor to receive the mixture of straw and kernels discharged from said cylinder, to move the mixture in a direction transversely of the direction of movement of the machine to facilitate escape of the kernels from the mixture, and a second conveyor for collecting the separated kernels and moving them in a direction parallel and opposite to the direction of movement of the mixture on said first conveyor.

9. In a combined harvesting-threshing machine, a frame, ground-engaging means for supporting said frame, the longitudinal axis of said frame being parallel to the direction of movement of the machine, means including a cylinder for threshing grain mounted on said frame with the axis of said cylinder parallel to the longitudinal axis of said frame, a header arranged on one side of and transversely with respect to the longitudinal axis of said frame, comprising a cutter and a conveyor to feed cut grain into said cylinder, a separator arranged on the other side of and transversely with respect to the longitudinal axis of said frame, including a conveyor to receive the mixture of straw and kernels discharged from said cylinder to move the mixture in a direction away from and transversely with respect to the longitudinal axis of said frame to facilitate escape of the kernels from the mixture, and a second conveyor for collecting the separated kernels and moving them in a direction toward and transversely with respect to the longitudinal axis of said frame.

10. In a combined harvesting-threshing machine, a frame, ground-engaging means for supporting said frame, the longitudinal axis of said frame being parallel to the direction of movement of the machine, means including a cylinder for threshing grain mounted on said frame, an engine mounted on said frame having a drive shaft, said drive shaft and the axis of said cylinder being arranged parallel to the longitudinal axis of said frame, a header arranged on one side of and transversely with respect to the longitudinal axis of said frame, comprising a cutter and a conveyor to feed cut grain into said cylinder, a separator arranged on the other side of and transversely with respect to the longitudinal axis of said frame, including a conveyor to receive the mixture of straw and kernels discharged from said cylinder to move the mixture in a direction away from and transversely with respect to the longitudinal axis of the machine to facilitate escape of the kernels from the mixture, and a second conveyor for collecting the separated kernels and moving them in a direction toward and transversely with respect to the longitudinal axis of the machine, a grain receptacle mounted on said frame, and means to transfer the grain kernels from said second conveyor in said separator to said receptacle, and means to transmit power from said engine to said cylinder, said cutter, said header conveyor, said separator conveyors and said grain-transferring means.

11. In a combined harvesting-threshing machine, a thresher including a rotary cylinder arranged with the axis thereof substantially parallel to the direction of movement of the machine, a header including means for conveying material into said thresher, and a separator unit having an end thereof in direct communication with said thresher, whereby the cylinder of said thresher serves to transfer material directly to the separator unit, said separator unit having means for moving all the material received thereby along the same path.

12. In a combined harvesting-threshing machine, a thresher including a rotary cylinder arranged with the axis thereof substantially parallel to the direction of movement of the machine, a header including means for conveying material into said thresher, and a separator unit extending entirely transversely with respect to said direction of movement of said machine and to said cylinder axis, said separator unit having an end thereof in direct communication with said thresher, whereby the cylinder of said thresher serves to transfer material directly to the separator unit, said separator unit also having means for moving all the material received thereby along the same path.

13. In a combined harvesting-threshing machine, a thresher including a rotary cylinder arranged with the axis thereof substantially parallel to the direction of movement of the machine, a header including means for conveying material into said thresher, and a separator unit including a rotary screw conveyor having an end thereof in communication with said thresher, whereby the cylinder of said thresher serves to transfer material to the rotary screw conveyor.

14. In a combined harvesting-threshing machine, a thresher including a rotary cylinder arranged with the axis thereof substantially parallel to the direction of movement of the machine, a header including means for conveying material into said thresher, and a separator unit including a rotary screw conveyor having an end thereof in communication with said thresher, whereby the cylinder of said thresher serves to transfer material to the rotary screw conveyor, the axis of said rotary screw conveyor extending transverse with respect to the axis of said cylinder and said direction of movement of the machine.

15. In a combined harvesting-threshing machine, a thresher including a rotary cylinder arranged with the axis thereof substantially parallel to the direction of movement of the machine, a header at one side of said thresher and including a rotary screw conveyor having its axis extending transverse with respect to said cylinder axis, and a separator at the opposite side of said thresher and including a rotary screw conveyor having its axis extending transverse with respect to said cylinder axis, whereby all the material is moved transversely with respect to the direction of movement of the machine.

16. In a combined harvesting-threshing machine, means including a cylinder for threshing grain, a header including conveying means to move material transversely of the direction of movement of the machine to said cylinder, a separator including a conveyor to receive the mixture of straw and kernels discharged from said cylinder and to move the material in a direction to facilitate escape of the kernels from said mixture, and a second conveyor for collecting the separated kernels and moving them in a direction parallel and opposite to the direction of movement of the mixture on said first conveyor.

17. In a combined harvesting-threshing machine, means including a cylinder for threshing grain, a header including conveying means to move material transversely of the direction of movement of the machine to said cylinder, a separator including a rotary screw conveyor to receive the mixture of straw and kernels discharged from said cylinder and to move the material in a direction to facilitate escape of the kernels from said mixture, a structure having apertures and over which the rotary screw conveyor is positioned so that the kernels can fall through said apertures, and a second conveyor below said structure for collecting the separated kernels and moving them in a direction parallel and opposite to the direction of movement of the mixture on the rotary screw conveyor.

LOWELL H. THOEN.